N. WILLIAMS.
GUARD AND SICKLE BAR ATTACHMENT.
APPLICATION FILED DEC. 27, 1917.
1,279,809.
Patented Sept. 24, 1918.
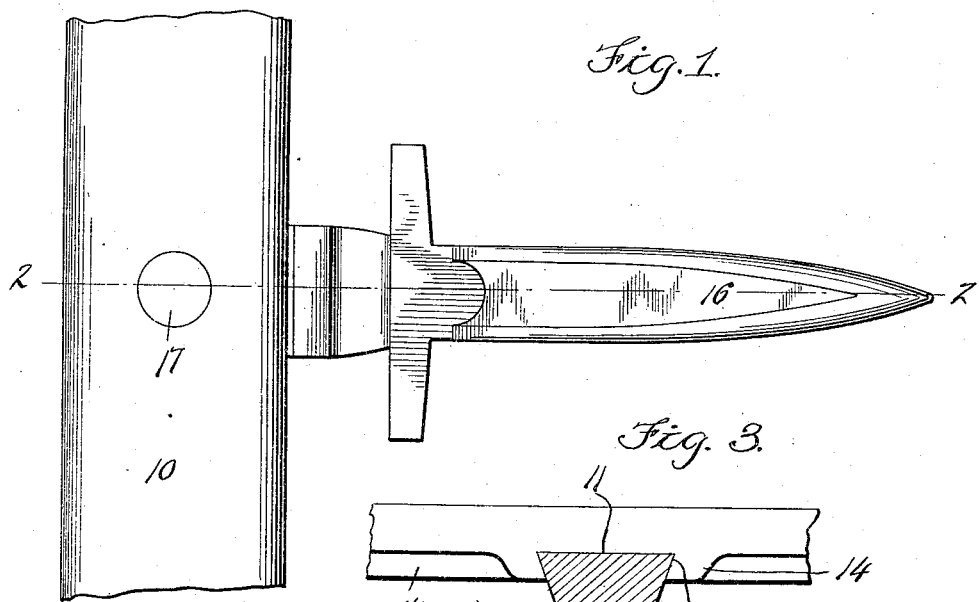
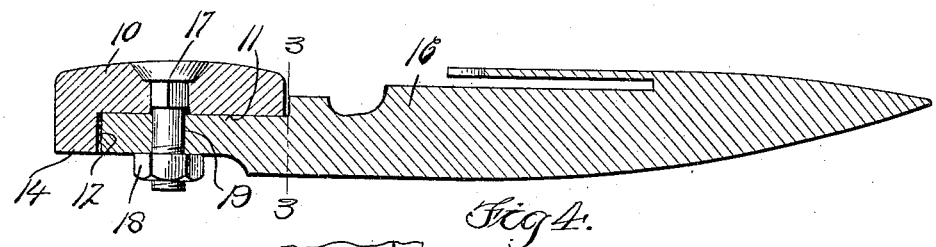
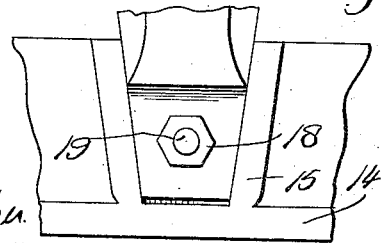
WITNESSES
INVENTOR
Norman Williams.
BY
ATTORNEY

UNITED STATES PATENT OFFICE.

NORMAN WILLIAMS, OF BLANCHARD, ILLINOIS.

GUARD AND SICKLE-BAR ATTACHMENT.

1,279,809.  Specification of Letters Patent.  Patented Sept. 24, 1918.

Application filed December 27, 1917. Serial No. 209,111.

*To all whom it may concern:*

Be it known that I, NORMAN WILLIAMS, a citizen of the United States, residing at Blanchard, in the county of Pope and State of Illinois, have invented certain new and useful Improvements in Guard and Sickle-Bar Attachments, of which the following is a specification.

This invention relates to harvesters and reapers, and it more particularly relates to sickle guards.

The primary object of this invention is to provide a device of this character that will greatly increase the efficiency and wear of both the sickle, the guard, the guard-bolts and the sickle knives.

Another object of the invention is to provide a device of this character which by a comparatively slight change may be applied for use on any ordinary wheat harvester, grass mower or corn harvester.

Other objects and advantages may become apparent to persons who read the following detailed description in connection with the accompanying drawings, in which:

Figure 1 is a top plan view:

Fig. 2 is a sectional view taken along the line 2—2 of Fig. 1:

Fig. 3 is a sectional view taken along the line 3—3 of Fig. 2: and

Fig. 4 is a fragmental bottom plan view of the sickle guard fitted in its seat in the sickle bar, the bolt being omitted.

Referring to these drawings in detail, in which similar reference characters correspond with similar parts throughout the several views, the sickle bar 10 is of special construction, being provided with an inwardly converging dove-tail recess or guard-seat 11. This guard-seat terminates in a shoulder 12 and its lateral sides 13 are downwardly converging. This dove-tailed seat is preferably formed in a thickened portion 14 which extends, as a flange, throughout the length of the bar 10 and comprises a stiffening rim or flange. The thickened portion 14 has forwardly diverging ribs or flanges 15 one side of each of which constitutes one of the downwardly converging faces 13.

The sickle guard 16 may be of any ordinary construction with the exception of its rear end portion, which latter is tapered rearwardly and downwardly, so as to fit snugly between the downwardly converging faces 13, and is slightly spaced from the shoulder 12 so that when the guard 16 is seated in the seat 11 and is driven backward, it wedges tightly between the rearwardly converging sides, so as to prevent the slightest lateral movement of the guard relative to the sickle bar.

In order to prevent accidental removal of the guard 16 from its seat, a bolt 17 and a nut 18 are provided; but these elements 17 and 18, being of ordinary construction, are not described in detail.

From the foregoing, it will be readily seen that I have provided a device which is extremely simple and therefore relatively inexpensive, and which is thoroughly practical, durable and efficient.

What I claim as my invention is:

A sickle bar having a depending longitudinal flange along its rear edge and depending forwardly diverging ribs joined at their rear ends to the longitudinal flange and forming therewith a seat.

In testimony whereof I affix my signature in presence of two witnesses.

NORMAN WILLIAMS.

Witnesses:
JOHN B. OWEN,
J. E. STONE.

Copies of this patent may be obtained for five cents each, by addressing the "Commissioner of Patents, Washington, D. C."